United States Patent
Yu et al.

(10) Patent No.: US 12,462,220 B2
(45) Date of Patent: Nov. 4, 2025

(54) ORDER PROCESSING METHOD, OUTBOUND METHOD, DEVICE, SYSTEM, AND STORAGE MEDIUM

(71) Applicant: HAI ROBOTICS CO., LTD., Guangdong (CN)

(72) Inventors: Runfang Yu, Guangdong (CN); Xin Ai, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 377 days.

(21) Appl. No.: 18/185,518

(22) Filed: Mar. 17, 2023

(65) Prior Publication Data
US 2023/0222442 A1    Jul. 13, 2023

Related U.S. Application Data

(63) Continuation of application No. PCT/CN2021/118502, filed on Sep. 15, 2021.

(30) Foreign Application Priority Data

Sep. 18, 2020 (CN) .......................... 202010985931.7

(51) Int. Cl.
*G06Q 10/087*    (2023.01)
(52) U.S. Cl.
CPC .................. *G06Q 10/087* (2013.01)
(58) Field of Classification Search
CPC ........... G06Q 10/087; G06Q 10/06312; G06Q 10/06316; G06Q 10/0633; G06Q 10/083; G06Q 30/0635; G06Q 10/047; G06Q 10/08
See application file for complete search history.

(56) References Cited

U.S. PATENT DOCUMENTS

| | | | | |
|---|---|---|---|---|
| 6,289,260 B1 * | 9/2001 | Bradley | ............... | B65G 1/1376 414/280 |
| 10,832,209 B2 * | 11/2020 | Rajkhowa | ............ | G06Q 10/087 |
| 2003/0171962 A1 * | 9/2003 | Hirth | .................... | G06Q 10/087 705/7.25 |

(Continued)

FOREIGN PATENT DOCUMENTS

| | | | |
|---|---|---|---|
| CN | 108202965 A | 6/2018 | |
| CN | 109656243 A | 4/2019 | |

(Continued)

OTHER PUBLICATIONS

International Search Report mailed Dec. 22, 2021; PCT/CN2021/118502.

(Continued)

*Primary Examiner* — Garcia Ade
(74) *Attorney, Agent, or Firm* — Frank Gao, Esq.

(57) ABSTRACT

The present disclosure provides an order processing method, an outbound method, a device, a system, and a storage medium. A server obtains a slot capacity of each workstation and a preset virtual capacity, determines a to-be-processed order of each workstation according to the slot capacity and the virtual capacity, and generates an outbound instruction according to the to-be-processed order. A transfer device transfers goods in the to-be-processed order from the warehouse according to the outbound instruction.

10 Claims, 8 Drawing Sheets

(56) References Cited

U.S. PATENT DOCUMENTS

| | | | |
|---|---|---|---|
| 2014/0040075 A1 | 2/2014 | Perry et al. | |
| 2016/0266555 A1* | 9/2016 | Favreau | A61M 5/172 |
| 2018/0211347 A1 | 7/2018 | Chen | |
| 2019/0266555 A1 | 8/2019 | Rajkhowa | |
| 2025/0094922 A1* | 3/2025 | Li | G06Q 10/087 |

FOREIGN PATENT DOCUMENTS

| | | |
|---|---|---|
| CN | 109816289 A | 5/2019 |
| CN | 110059926 A | 7/2019 |
| CN | 110097414 A | 8/2019 |
| CN | 110533353 A | 12/2019 |
| CN | 111461547 A | 7/2020 |
| CN | 112116247 A | 12/2020 |
| JP | 200973661 A | 4/2009 |
| JP | 2020505293 A | 2/2020 |
| JP | 2020147444 A | 9/2020 |
| WO | 2007/011814 A2 | 1/2007 |
| WO | 2015097736 A1 | 7/2015 |

OTHER PUBLICATIONS

Written Opinion of the International Searching Authority mailed Dec. 22, 2021; PCT/CN2021/118502.
Extended European Search Report dated Jan. 19, 2024; Appln. No. 21868646.7.
Japanese Notice of Refusal; Appln. No. 2023-517902.
Australian Examination Report No. 1; Appln. No. 2021343577; Report date Mar. 14, 2024.

\* cited by examiner

ORDER PROCESSING METHOD, OUTBOUND METHOD, DEVICE, SYSTEM, AND STORAGE MEDIUM

CROSS-REFERENCE TO RELATED APPLICATIONS

This application is a continuation of International Patent Application No. PCT/CN2021/118502 filed on Sep. 15, 2021, which claims priority to Chinese Patent Application No. 202010985931.7, entitled "ORDER PROCESSING METHOD, OUTBOUND METHOD, DEVICE, SYSTEM, AND STORAGE MEDIUM" and filed with the China National Intellectual Property Administration on Sep. 18, 2020, which are incorporated herein by references in their entireties.

TECHNICAL FIELD

The present disclosure relates to the field of smart warehousing technologies, and in particular, to an order processing method, an outbound method, a device, a system, and a storage medium.

BACKGROUND

Warehouse management refers to the storage and keeping of materials through warehouses. Generally, warehouse management refers to the whole process of activities from the receipt of storing materials, storage and keeping operations, and until the materials are released in good condition.

As an operation activity in warehouse management, outbound specifically refers to a process of taking out a corresponding case from the warehouse according to received order information, and retrieving ordered goods from the case by a workstation. The common outbound manner is as follows: A scheduling system first assigns a specific quantity of orders to each workstation according to the capacity of the workstation. The scheduling system then assigns a task of moving cases to a transfer device according to goods requirements in the orders of each workstation. The transfer device carries a designated case to the workstation, and after the staff completes the task of picking up goods from the case, the transfer device moves the case back to the warehouse. The scheduling system then assigns a specific quantity of remaining orders to the workstations, and so on, until all orders are assigned.

However, the existing order processing method is less efficient when the quantity of orders is large.

SUMMARY

The present disclosure provides an order processing method, an outbound method, a device, a system, and a storage medium, to provide an order processing method with higher outbound efficiency in the case of a large quantity of orders.

According to a first aspect, this application provides an order processing method, applied to a server, the method including:
obtaining a free slot capacity and a preset virtual capacity of a workstation; and
determining to-be-processed orders of the workstation according to the free slot capacity and the virtual capacity.

Optionally, the determining to-be-processed orders of the workstation according to the free slot capacity and the virtual capacity further includes:
obtaining priorities of to-be-assigned orders; and
determining the to-be-processed orders from the to-be-assigned orders according to the priorities of the to-be-assigned orders, where
a quantity of the to-be-processed orders is a sum of the free slot capacity and the virtual capacity.

Optionally, after the determining the to-be-processed orders from the to-be-assigned orders according to the priorities of the to-be-assigned orders, the method includes:
obtaining priorities of the to-be-processed orders; and
determining currently processed orders from the to-be-processed orders according to the priorities of the to-be-processed orders, where
a quantity of the currently processed orders is the free slot capacity.

Optionally, after the determining the to-be-processed orders from the to-be-assigned orders according to the priorities of the to-be-assigned orders, the method further includes:
obtaining priorities of the to-be-processed orders; and
determining delayed processed orders from the to-be-processed orders according to the priorities of the to-be-processed orders, where
a quantity of the delayed processed orders is the virtual capacity.

Optionally, after the determining to-be-processed orders of the workstation according to the free slot capacity and the virtual capacity, the method further includes:
generating an outbound instruction according to the to-be-processed orders, so that a transfer device carries goods in the to-be-processed orders out of a warehouse.

Optionally, the generating an outbound instruction according to the to-be-processed orders further includes:
obtaining first order information of the currently processed orders and a location of a workstation; and
generating a first outbound instruction according to the first order information and the location of the workstation, where
the first outbound instruction is used for causing the transfer device to move goods in the currently processed orders to the workstation for picking.

Optionally, the generating an outbound instruction according to the to-be-processed orders further includes:
obtaining second order information of the delayed processed orders and a location of a pre-storage area; and
generating a second outbound instruction according to the second order information and the location of the pre-storage area, where
the second outbound instruction is used for causing the transfer device to move goods in the delayed processed orders to the pre-storage area for waiting.

Optionally, the generating an outbound instruction according to the to-be-processed orders further includes:
obtaining first order information of the currently processed orders, second order information of the delayed processed orders, a location of a workstation, and a location of a pre-storage area; and
generating a third outbound instruction according to the first order information, the second order information, the location of the workstation, and the location of the pre-storage area, where
the third outbound instruction is used for causing the transfer device to move goods in the currently processed orders to the workstation for picking, and causing the transfer device to move goods in the delayed processed orders to the pre-storage area for waiting, and the goods in the currently processed orders are moved to the workstation preferentially.

Optionally, after the determining to-be-processed orders of the workstation according to the free slot capacity and the virtual capacity, the method further includes:

receiving a working status of slots sent by the workstation; and generating a scheduling instruction according to priorities of the delayed processed orders when the working status is switched from an occupied state to an idle state, where the scheduling instruction is used for causing the transfer device to move goods in the delayed processed orders from the pre-storage area to the workstation for picking.

According to a second aspect, this application provides an outbound method, applied to a transfer device, the method including:

receiving an outbound instruction sent by a server, where the outbound instruction is generated according to to-be-processed orders, and the to-be-processed orders are determined according to a free slot capacity and a preset virtual capacity of a workstation; and transferring goods in the to-be-processed orders out of a warehouse according to the outbound instruction.

Optionally, the to-be-processed orders include currently processed orders and delayed processed orders, a quantity of the currently processed orders is the free slot capacity, and a quantity of the delayed processed orders is the virtual capacity.

Optionally, the outbound instruction includes a third outbound instruction; and the transferring goods in the to-be-processed orders out of a warehouse according to the outbound instruction further includes:

moving a first case corresponding to first goods in the currently processed orders and a second case corresponding to second goods in the delayed processed orders from the warehouse to the workstation according to the third outbound instruction.

Optionally, the moving a first case corresponding to first goods in the currently processed orders and a second case corresponding to second goods in the delayed processed orders from the warehouse to the workstation according to the third outbound instruction further includes:

parsing a first path from the third outbound instruction;

respectively taking out the first case and the second case from the warehouse according to the first path; and moving the first case and the second case to the workstation according to the first path.

Optionally, after the moving the first case and the second case to the workstation according to the first path, the method further includes:

determining whether the first goods are taken out from the first case;

moving the second case to a pre-storage area according to the first path if the first goods are taken out from the first case; or continuously stopping at the workstation if the first goods are not taken out from the first case.

Optionally, after the moving the second case to a pre-storage area according to the first path, the method further includes:

receiving a scheduling instruction sent by the server;

parsing the scheduling instruction to obtain a second path; and moving the second case from the pre-storage area to the workstation according to the second path.

Optionally, after the moving the second case from the pre-storage area to the workstation according to the second path, the method further includes:

determining whether the second goods are taken out from the second case;

moving the second case from the workstation to a specified location if the second goods are taken out from the second case; or continuously stopping at the workstation if the second goods are not taken out from the second case.

Optionally, the outbound instruction includes a second outbound instruction; and the transferring goods in the to-be-processed orders out of a warehouse according to the outbound instruction further includes:

moving a second case corresponding to second goods in the delayed processed orders from the warehouse to a pre-storage area according to the second outbound instruction.

Optionally, the moving a second case corresponding to second goods in the delayed processed orders from the warehouse to a pre-storage area according to the second outbound instruction further includes:

parsing a third path from the second outbound instruction;

taking out the second case from the warehouse according to the third path; and moving the second case from the warehouse to the pre-storage area according to the third path.

Optionally, after the moving the second case from the warehouse to the pre-storage area according to the third path, the method further includes:

receiving a scheduling instruction sent by the server, where the scheduling instruction is generated when a working status of slots of the workstation is switched from an occupied state to an idle state; and moving the second case from the pre-storage area to the workstation according to the scheduling instruction.

Optionally, after the moving the second case from the pre-storage area to the workstation according to the scheduling instruction, the method further includes:

determining whether the second goods are taken out from the second case;

moving the second case from the workstation to a specified location if the second goods are taken out from the second case; or continuously stopping at the workstation if the second goods are not taken out from the second case.

According to a third aspect, this application provides an order processing apparatus, including:

an obtaining module, configured to obtain a free slot capacity and a preset virtual capacity of a workstation; and a first processing module, configured to determine to-be-processed orders of the workstation according to the free slot capacity and the virtual capacity.

According to a fourth aspect, this application provides an outbound apparatus, including:

a receiving module, configured to receive an outbound instruction sent by a server, where the outbound instruction is generated according to to-be-processed orders, and the to-be-processed orders are determined according to a free slot capacity and a preset virtual capacity of a workstation; and a second processing module, configured to carry goods in the to-be-processed orders out of a warehouse according to the outbound instruction.

According to a fifth aspect, the present disclosure provides a server, including:

a memory, configured to store a program; and a processor, configured to execute the program stored in the memory, where when the program is executed, the processor is configured to perform the order processing method according to the first aspect and optional solutions.

According to a sixth aspect, the present disclosure provides a transfer device, including:

a memory, configured to store a program; and a processor, configured to execute the program stored in the memory, where when the program is executed, the processor is configured to perform the outbound method according to the second aspect and optional solutions.

According to a seventh aspect, the present disclosure provides a scheduling system, including: the server according to the fifth aspect, the transfer device according to the fifth aspect, and a workbench.

According to an eighth aspect, the present disclosure provides a computer-readable storage medium, including instructions, where the instructions, when run on a computer, cause the computer to perform the order processing method according to the first aspect and optional solutions and the outbound method according to the second aspect and optional solutions.

The present disclosure provides an order processing method, an outbound method, a device, a system, and a storage medium. A server determines a to-be-processed order of each workstation according to a free slot capacity of the workstation and a virtual capacity. According to this solution, more orders can be assigned at a time, and thus more goods can be transferred from the warehouse at a time, improving the outbound efficiency. In addition, the to-be-processed order is divided into a currently processed order and a delayed processed order. The transfer device performs both the task of moving goods in the currently processed orders and the task of moving goods in the delayed processed orders, which can make full use of the capacity of the transfer device and avoid reciprocation of the transfer device between a storage space and a workstation, thereby improving the outbound efficiency. In addition, the working status of a slot of the workstation is monitored in real time. When the slot of the workstation is free, goods in the delayed processed order with higher priorities are moved from the pre-storage area to the workbench for picking. Since the goods are pre-moved to the pre-storage area, the movement time is shortened compared with moving the goods from the storage space to the workbench, which can reduce the waiting time of the workbench and improve the outbound efficiency.

DETAILED DESCRIPTION

To make the objectives, technical solutions, and advantages of the present disclosure clearer, the following clearly and completely describes the technical solutions in the present disclosure with reference to the accompanying drawings in the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

The present disclosure provides an order processing method, an outbound method, a device, a system, and a storage medium, to provide a rapid order processing method in the case of a large quantity of orders. The inventive concept of the present disclosure is to configure a virtual capacity for a workstation, and assign a order to each workstation according to the virtual capacity and a free slot capacity, where orders more than the free slot capacity can be assigned at a time. An outbound instruction is then generated according to to-be-processed orders, so that a transfer device can move goods in the to-be-processed orders from the warehouse, improving the outbound efficiency.

Figure 1:
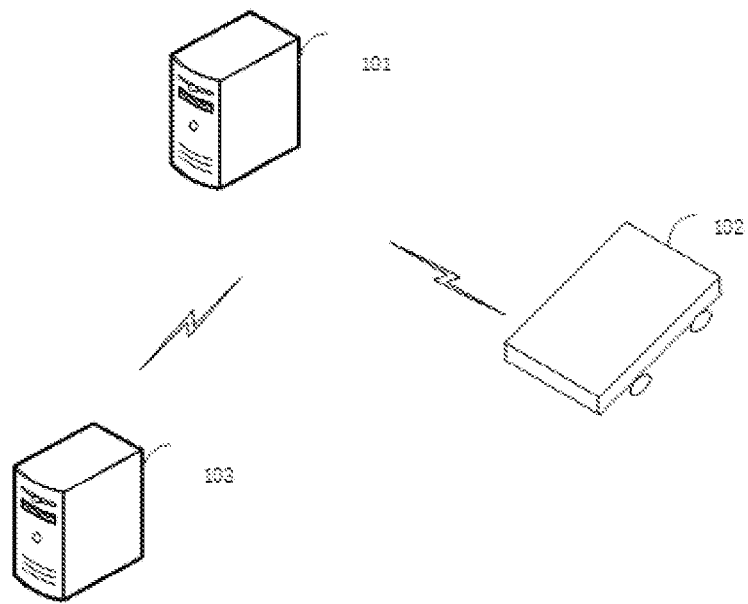
FIG. 1 is a schematic structural diagram of an order processing system according to an embodiment of the present disclosure.

As shown in FIG. 1, the order processing method and the outbound method provided in the present disclosure are applied to the following outbound application scenario. The warehouse may be a single-level warehouse and/or a multi-level warehouse. An order processing system 100 includes a server 101, a transfer device 102, and a workstation 103. There may be a plurality of transfer devices 102 and a plurality of workstations 103 respectively, which are set according to the requirements of the warehouse or orders. The server 101 and the transfer device 102 communicate with each other, and the server 101 and the workstation 103 communicate with each other.

After being sorted, goods are placed in cases, and the cases are placed in storage spaces of the warehouse. When the goods in the cases need to be delivered out of the warehouse, the server receives outbound orders sent by other terminals to form to-be-assigned orders. The server 101 issues an outbound instruction to the transfer device 102, and the transfer device 102 removes a case corresponding to goods in an outbound order according to the outbound instruction. The goods in the outbound order may be in one case, that is, only one case needs to be moved out of the warehouse. The goods may be alternatively in a plurality of cases, that is, the plurality of cases need to be moved out of the warehouse. The workstation 103 acts as a picking point to remove goods from a case. After the goods in the outbound order are picked, the goods in the outbound order are carried to a packing area for packing.

The server assigns a to-be-processed order to the workstation according to a free slot capacity of the workstation and a preset virtual capacity, and generates an outbound instruction correspondingly. The transfer device picks out a case corresponding to goods in the to-be-processed order out of the warehouse according to the outbound instruction. When the to-be-processed order is a currently processed order, the case corresponding to the goods is moved to the workstation. When the to-be-processed order is a delayed processed order, the case corresponding to the goods is moved to a pre-storage area. When the to-be-processed orders are a currently processed order and a delayed processed order, the cases corresponding to the goods are first moved to the workstation, and then moved to another workstation or the pre-storage area according to a scheduling instruction.

Figure 2:
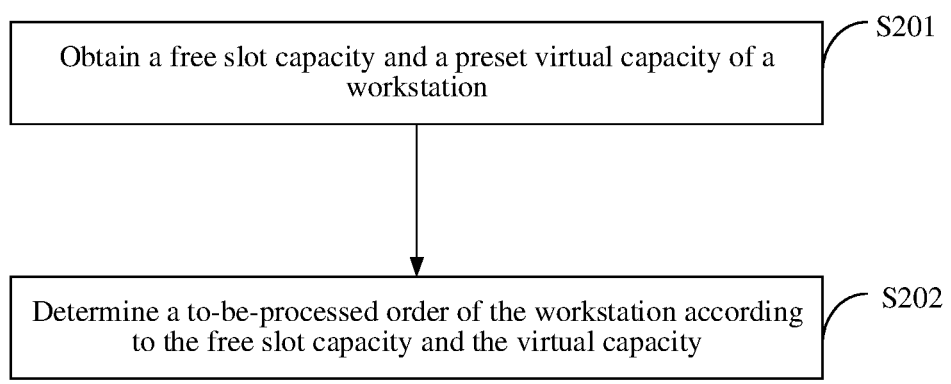
FIG. 2 is a schematic flowchart of an order processing method according to an embodiment of the present disclosure.

As shown in FIG. 2, an embodiment of the present disclosure provides an order processing method, and the order processing method is applied to a server. The order processing method includes the following steps:

S201: The server obtains a free slot capacity and a preset virtual capacity of a workstation.

The workstation acts as a picking point and is usually provided with a plurality of slots to process a plurality of orders simultaneously. The free slot capacity of each workstation refers to a quantity of slots, which determines a quantity of orders to be processed. The virtual capacity of the workstation is preset and may be set according to the free slot capacity of the workstation, which may be set, for example, to be the same as the free slot capacity, or may be set according to the size of the pre-storage area. The pre-storage area refers to the area where the transfer device loaded with cases is temporarily parked.

S202: The server determines a to-be-processed order of the workstation according to the free slot capacity and the virtual capacity.

A to-be-assigned order is a goods order that has not been assigned to the workstation. The server determines a quantity of orders that can be processed by each workstation according to the free slot capacity and the virtual capacity, and then selects a corresponding quantity of orders from the to-be-assigned orders and assigns the orders to the workstation. The workstation processes the orders.

The server may select the to-be-assigned order according to a priority of the to-be-assigned order. The priority of each to-be-assigned order may be determined according to an order submission time, an order level, and the like.

According to the order processing method provided in the embodiments of the present disclosure, orders are assigned to each workstation according to a virtual capacity and a free slot capacity, orders more than the free slot capacity can be assigned at a time, and more goods can be carried out of the warehouse at a time, improving the outbound efficiency.

Figure 3:
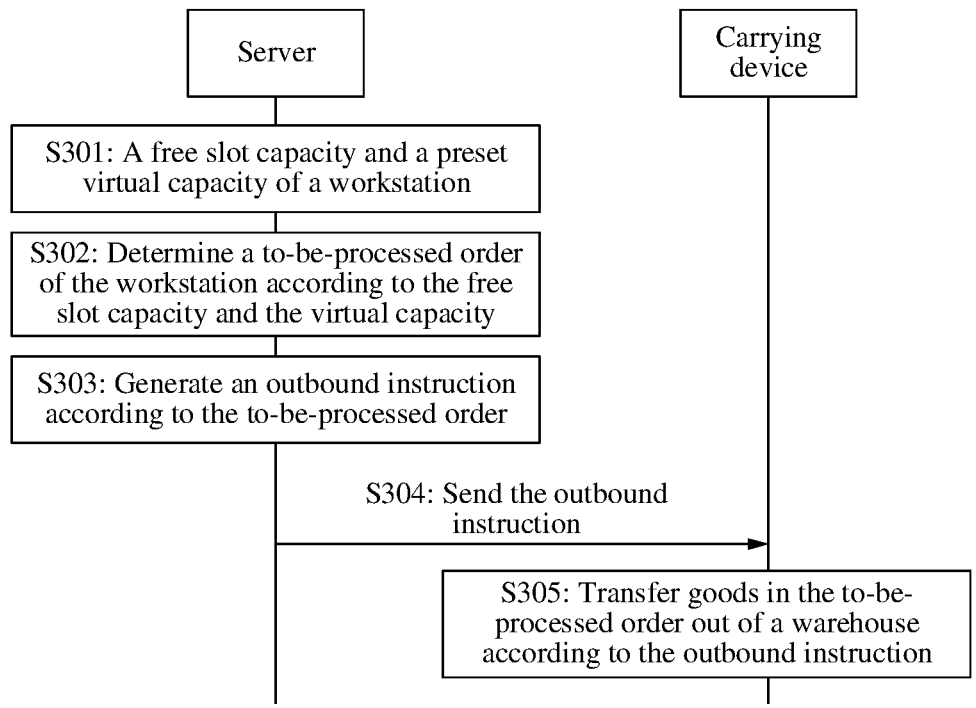
FIG. 3 is a schematic flowchart of an outbound method according to another embodiment of the present disclosure.

As shown in FIG. 3, another embodiment of the present disclosure provides an outbound method, and the outbound method is applied to an order processing system. The outbound method includes the following steps:

S301: A server obtains a free slot capacity and a preset virtual capacity of a workstation.

This step is described in detail in S201, and the details are not repeated herein.

S302: The server determines a to-be-processed order of the workstation according to the free slot capacity and the virtual capacity.

This step is described in detail in S202, and the details are not repeated herein.

S303: The server generates an outbound instruction according to the to-be-processed order.

The server determines order information of each to-be-processed order, where the order information includes an order ID, a name and a quantity of goods required for the order, and an order priority. An outbound instruction is then generated according to the order information and the location of the workstation.

S304: The transfer device receives the outbound instruction sent by the server.

The outbound instruction is generated according to a to-be-processed order, and the to-be-processed order is determined from to-be-assigned orders according to a free slot capacity and a preset virtual capacity.

S305: The transfer device transfers goods in the to-be-processed order out of a warehouse according to the outbound instruction.

After receiving the outbound instruction, the transfer device parses the outbound instruction to obtain a corresponding movement path. When the transfer device transfers goods, a case where the goods are located is the smallest transfer unit. After the movement path is obtained, the case corresponding to the goods in the to-be-processed order is taken out from the warehouse and moved from the warehouse to a specified location.

According to the outbound method provided in the embodiments of the present disclosure, orders are assigned to each workstation according to the virtual capacity and the free slot capacity, where orders more than the free slot capacity can be assigned at a time. An outbound instruction is then generated according to to-be-processed orders, so that a transfer device can move goods in the to-be-processed orders from the warehouse, improving the outbound efficiency.

In an example where the transfer device transfers goods in a type of order, another embodiment of the present disclosure provides an outbound method, applied to the foregoing order processing system. The outbound method includes the following steps:

S401: A server obtains a free slot capacity and a preset virtual capacity of a workstation.

This step is described in detail in S201, and the details are not repeated herein.

S402: The server determines a to-be-processed order of the workstation according to the free slot capacity and the virtual capacity.

The server may select a the to-be-assigned order according to priorities of the to-be-assigned orders. Specifically, priorities of the to-be-assigned orders are obtained. The priority of each to-be-assigned order may be determined according to an order submission time, an order level, and the like. The to-be-processed order is determined from the to-be-assigned orders according to the priorities of the to-be-assigned orders, so that a quantity of the to-be-processed orders is a sum of the free slot capacity and the virtual capacity.

Figure 4:
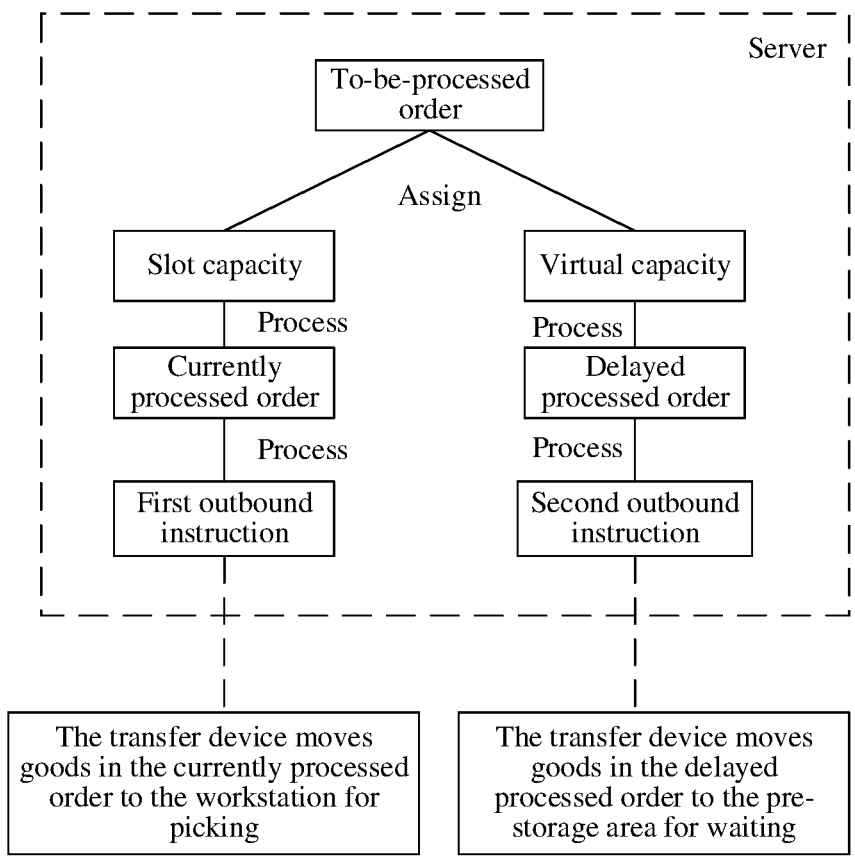
FIG. 4 is a schematic principle diagram of an outbound method according to another embodiment of the present disclosure.

As shown in FIG. 4, the to-be-processed order include a currently processed order and a delayed processed order. The currently processed order refers to an order that is currently processed by the workstation, and the delayed processed order is an order waiting to be processed by the workstation. That is, the workstation processes the currently processed order, and then process the delayed processed order.

Priorities of the to-be-processed orders are obtained; and a currently processed order is determined from the to-be-processed orders according to the priorities of the to-be-processed orders, so that a quantity of the currently processed orders is the free slot capacity. The to-be-processed orders with high priorities are used as currently processed orders. Since the currently processed orders are limited by the free slot capacity, a quantity of the currently processed orders is set to the free slot capacity.

For example, if the free slot capacity is 5, the to-be-processed orders with the top five priorities are used as the currently processed orders.

A delayed processed order is determined from the to-be-processed orders according to the priorities of the to-be-processed orders, so that a quantity of the delayed processed orders is the virtual capacity. Orders with low priorities in the to-be-processed orders are used as delayed processed orders. That is, after the currently processed orders are determined, the remaining orders are used as the delayed processed orders.

S403: The server generates an outbound instruction according to the to-be-processed order.

As shown in FIG. 4, the outbound instruction includes a first outbound instruction and a second outbound instruction. The first outbound instruction is used for causing the transfer device to move goods in the currently processed order to the workstation for picking. The second outbound instruction is used for causing the transfer device to move goods in the delayed processed order to the pre-storage area for waiting. The same transfer device can only receive one of the first outbound instruction and the second outbound instruction.

The first outbound instruction and the second outbound instruction are respectively obtained according to the following steps.

First order information of the currently processed order and a location of a workstation are obtained, where the first order information includes a to-be-processed order ID, a name and a quantity of goods required for the to-be-processed order, and a priority of the to-be-processed order. A first outbound instruction is generated according to the first order information and the location of the workstation. Specifically, a movement path is generated according to a storage space of the goods and the location of the workstation. The first outbound instruction is then generated according to the movement path. After parsing the first outbound instruction to obtain the movement path, the transfer device may move, according to the movement path, a first case corresponding to first goods in the currently processed order to the workstation for picking.

Second order information of the delayed processed order and a location of a pre-storage area are obtained, where the second order information includes a delayed processed order ID, a name and a quantity of goods required for the delayed processed order, and a priority of the delayed processed order. The pre-storage area refers to the area where the transfer device loaded with a case is temporarily parked. For example, the pre-storage area may include one or any combination of a set waiting area, a charging pile area, and an area that does not obstruct passage. That is, the pre-storage area may be a preset waiting area. The waiting area may be close to the workstation. When the delayed processed orders are processed, quick movement to the workbench or queue in the operating area of the workbench can be implemented. The pre-storage area may be alternatively an area without a fixed location, such as a charging pile or an area in a warehouse aisle that does not affect passage.

A second outbound instruction is further generated according to the second order information and the location of the pre-storage area. Specifically, a movement path is generated according to a storage space of the goods and the location of the pre-storage area. The second outbound instruction is then generated according to the movement path. After parsing the second outbound instruction to obtain the movement path, the transfer device may move, according to the movement path, a second case corresponding to second goods in the delayed processed order to the pre-storage area for waiting.

S404: The transfer device receives the outbound instruction sent by the server.

The outbound instruction includes a first outbound instruction and a second outbound instruction. In addition, the same transfer device can only receive one of the first outbound instruction and the second outbound instruction. That is, the transfer device can only perform one of the moving task of the current outbound order or the moving task of the delayed processed order.

S405: The transfer device transfers a case corresponding to goods in the to-be-processed order out of the warehouse according to the outbound instruction.

Still referring to FIG. 4, when receiving the second outbound instruction, the transfer device moves the second goods in the delayed processed order from the storage space to the pre-storage area according to the second outbound instruction. That is, the second outbound instruction is parsed, and the movement task is executed according to the analysis result, to implement the movement of the second goods in the currently processed order from the warehouse to the pre-storage area.

The moving the second goods in the delayed processed order from the storage space to the pre-storage area according to the second outbound instruction may further include: parsing a third path from the second outbound instruction, and taking out the second case corresponding to the second goods from the warehouse according to the third path. The second case is moved from the warehouse to the pre-storage area according to the third path. That is, when performing the movement task, the transfer device first performs the picking task and places the second case in the rack. After all the cases corresponding to the delayed processed order are taken out from the storage spaces, the cases are moved to the pre-storage area.

When receiving the first outbound instruction, the transfer device moves the case corresponding to the first goods in the currently processed order from the storage space to the workstation according to the first outbound instruction. That is, the first outbound instruction is parsed, and the movement task is executed according to the analysis result, to implement the movement of the first case corresponding to the first goods in the currently processed order from the warehouse to the workstation.

The moving the first case corresponding to the first goods in the currently processed order from the storage space to the workstation according to the first outbound instruction may specifically include: parsing a fourth path from the first outbound instruction. The first case corresponding to the first goods is taken out from the warehouse according to the fourth path. The first case is moved from the warehouse to the workstation according to the fourth path. That is, when performing the movement task, the transfer device first performs the picking task and places the first case in the rack. After all the cases corresponding to the currently processed order are taken out from the storage spaces, the cases are moved to the operating area of the workstation.

In the outbound method provided in the embodiments of the present disclosure, a to-be-processed order is divided into a currently processed order and a delayed processed order. The goods in the currently processed order are moved to the workstation, and the goods in the delayed processed order are moved to the pre-storage area. The goods in the delayed processed order do not affect the normal picking of the workstation, and the goods in the delayed processed order may be further moved out of the storage space for waiting to be picked, improving the outbound efficiency.

In an example where the transfer device transfers goods in two types of orders, another embodiment of the present disclosure provides an outbound method, where the outbound method is applied to the foregoing order processing system. The outbound method includes the following steps:

S501: A server obtains a free slot capacity and a preset virtual capacity of a workstation.

This step is described in detail in S201, and the details are not repeated herein.

S502: The server determines a to-be-processed order of the workstation according to the free slot capacity and the virtual capacity.

This step is described in detail in S202, and the details are not repeated herein.

S503: The server generates an outbound instruction according to the to-be-processed order.

Figure 5:
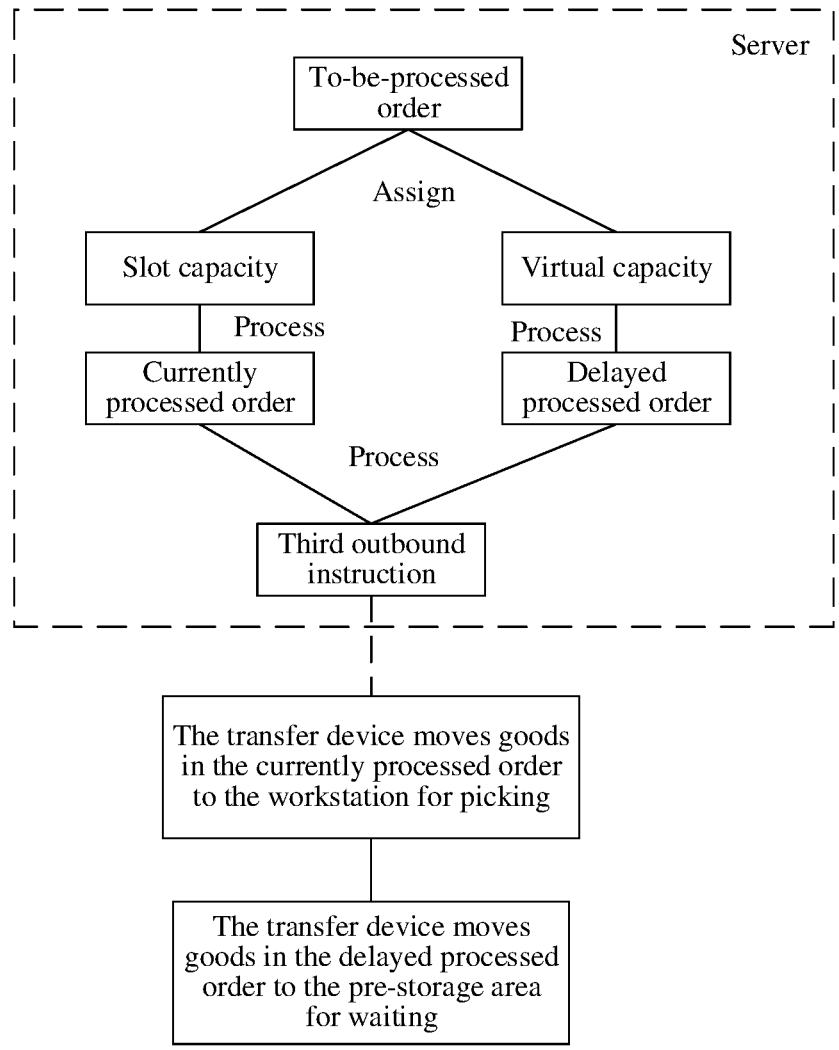
FIG. 5 is a schematic principle diagram of an outbound method according to another embodiment of the present disclosure.

As shown in FIG. 5, the outbound instruction includes a third outbound instruction. The third outbound instruction is used for causing the transfer device to move goods in the currently processed order to the workstation for picking, and causing the transfer device to move goods in the delayed processed order to the pre-storage area for waiting, and the goods in the currently processed orders are moved to the workstation preferentially.

The third outbound instruction is obtained according to the following steps: obtaining first order information of the currently processed order, second order information of the delayed processed order, and a location of the workstation; and generating a third outbound instruction according to the first order information, the second order information, and the location of the workstation. Specifically, a first movement path is generated according to a storage space of the goods in the currently processed order, a storage space of the goods in the delayed processed order, and the location of the workstation. The third outbound instruction is generated according to the first movement path, so that the transfer device moves a first case corresponding to first goods in the currently processed order and a second case corresponding to second goods in the delayed processed order to the workstation according to the third outbound instruction.

After the goods in the currently processed order are picked at the workstation, the second case is moved to the pre-storage area. Both the second case and the first case can be moved to the pre-storage area, and after a slot is free, the second case and the first case can be moved to the workbench. Alternatively, only the second case is moved to the pre-storage area, and the second case is moved to the workbench after the slot is free. For example, when the quantity of goods in the first case is less than a quantity threshold for sorting the cases or the first case is empty, the first case may be placed in a temporary storage point, and only the second case is carried to the pre-storage area.

S504: The transfer device receives the outbound instruction sent by the server.

The outbound instruction includes a third outbound instruction. That is, the transfer device needs to take out the first case corresponding to the first goods in the currently processed order, and further needs to take out the second case corresponding to the second goods in the delayed processed order.

S505: The transfer device carries cases corresponding to goods in the to-be-processed orders out of the warehouse according to the outbound instruction.

Still referring to FIG. 5, when receiving the third outbound instruction, the transfer device moves the first goods in the currently processed order and the second goods in the delayed processed order from the storage spaces to the workstation and the pre-storage area respectively according to the third outbound instruction. That is, the third outbound instruction is parsed, and the movement task is executed according to the analysis result, to implement the movement of the first goods in the currently processed order and the second goods in the delayed processed order from the warehouse to the workstation and the pre-storage area. In addition, the first goods in the currently processed order are preferentially moved from the warehouse to the workstation.

The moving the first goods in the currently processed order and the second goods in the delayed processed order from the storage spaces to the workstation and the pre-storage area respectively according to the third outbound instruction specifically includes: moving the first goods corresponding to the first case and the second goods corresponding to the second case to the workstation, and moving the first goods corresponding to the first case and the second goods corresponding to the second case to the pre-storage area.

The moving the first goods corresponding to the first case and the second goods corresponding to the second case to the workstation specifically includes: parsing a first path from the third outbound instruction; respectively taking out the first case corresponding to the first goods and the second case corresponding to the second goods from each storage space according to the first path; and moving the first case and the second case to the workstation according to the first path. That is, when the movement task is performed, the picking task is performed first, and the first case and the second case are placed in the rack. After being taken out from the storage spaces, the first case and the second case are moved to the workstation.

The moving the second goods corresponding to the second case to the pre-storage area specifically includes: determine whether the first goods are taken out from the first case; moving the second case to the pre-storage area according to the second path if the first goods are taken out from the first case; or continuously stopping at the workstation if the first goods are not taken out from the first case. The transfer device determines whether information about the completion of picking at the workstation is received, and determines, if the information is received, that all the first goods are taken out of the first case. When the second case is moved to the pre-storage area, the first case may be alternatively still placed on the transfer device. The first case may be alternatively placed at a specified location, which is not limited herein.

In the outbound method provided in the embodiments of the present disclosure, a to-be-processed order is divided into currently processed orders and delayed processed orders. The transfer device performs both the task of moving goods in the currently processed order and the task of moving goods in the delayed processed order, which can make full use of the capacity of the transfer device and avoid reciprocation of the transfer device between storage spaces and the workstation, thereby improving the outbound efficiency.

Figure 6:
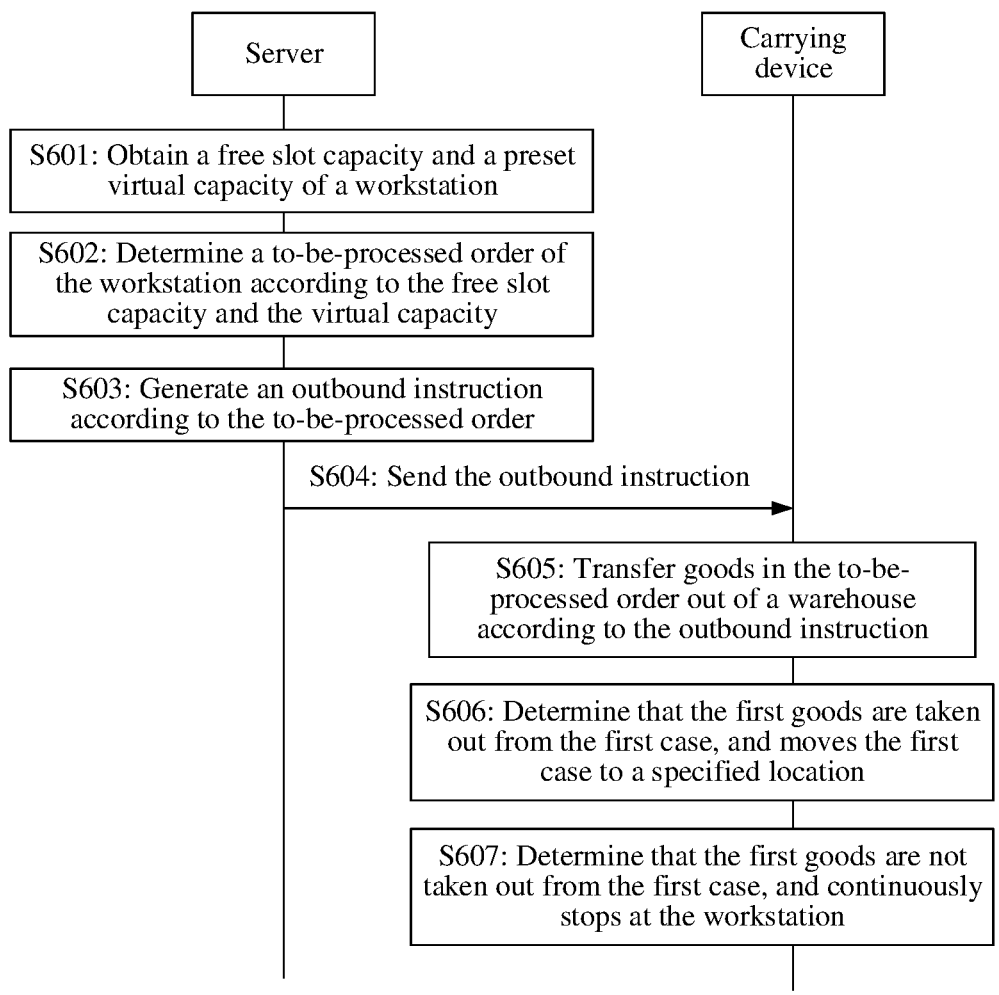
FIG. 6 is a schematic flowchart of an outbound method according to another embodiment of the present disclosure.

As shown in FIG. 6, in an example where the transfer device can only move goods in a currently processed order, another embodiment of the present disclosure provides an outbound method, where the outbound method is applied to the foregoing order processing system. The outbound method includes the following steps:

S601: A server obtains a free slot capacity and a preset virtual capacity of a workstation.

This step is described in detail in S201, and the details are not repeated herein.

S602: The server determines a to-be-processed order of the workstation according to the free slot capacity and the virtual capacity.

This step is described in detail in S302, and the details are not repeated herein.

S603: The server generates an outbound instruction according to the to-be-processed order.

The outbound instruction includes a first outbound instruction and a second outbound instruction. In addition, the same transfer device can only receive one of the first outbound instruction and the second outbound instruction. The first outbound instruction is used for instructing the transfer device to move goods in the currently processed order to the workstation for picking. The second outbound instruction is used for instructing the transfer device to move goods in the delayed processed order to the pre-storage area for waiting to be picked.

S604: The transfer device receives the outbound instruction sent by the server.

The transfer device can only receive the first outbound instruction. That is, the transfer device is configured to move goods in the currently processed order to the workstation for picking.

S605: The transfer device transfers goods in the to-be-processed order out of a warehouse according to the outbound instruction.

When receiving the first outbound instruction, the transfer device parses the first outbound instruction to obtain a movement path. According to the movement path, the first goods in the currently processed order are moved from the storage space to the workbench for picking.

S606: The transfer device determines that the first goods are taken out from the first case, and moves the first case to a specified location.

When the transfer device determines that the workbench completes the task of picking the currently processed order, it is determined that the first goods are taken out from the first case. When it is determined that the task of picking the currently processed orders is completed, the first case is moved to the specified location, to perform the box returning task.

The specified location may be the original storage space of the first case in the warehouse, another storage space in the warehouse, a temporary storage point, or a storage point for storing empty cases. That is, the case returning task may be performed according to the condition of the goods in the first case.

For example, when the quantity of goods in the first case is greater than the quantity threshold for sorting a case, the first case may be carried to the original storage space or other storage spaces in the warehouse. Otherwise, the first case may be carried to a temporary storage point, and the first case may be combined with other cases for sorting. If the first case is empty, the first case may be carried to an empty case storage point.

S607: The transfer device determines that the first goods are not taken out from the first case, and continuously stops at the workstation.

When determining that the workbench does not complete the task of picking the currently processed orders, the transfer device continuously stops at the workbench and waits for the workbench to continue picking. The case is returned to the storage space until the workbench completes the picking task.

In the outbound method provided in the embodiments of the present disclosure, it is monitored whether the workbench completes the picking of the goods in the currently processed order. After the picking is completed, if the case moved by the transfer device corresponds to the currently processed order, the case returning task is performed.

Figure 7:
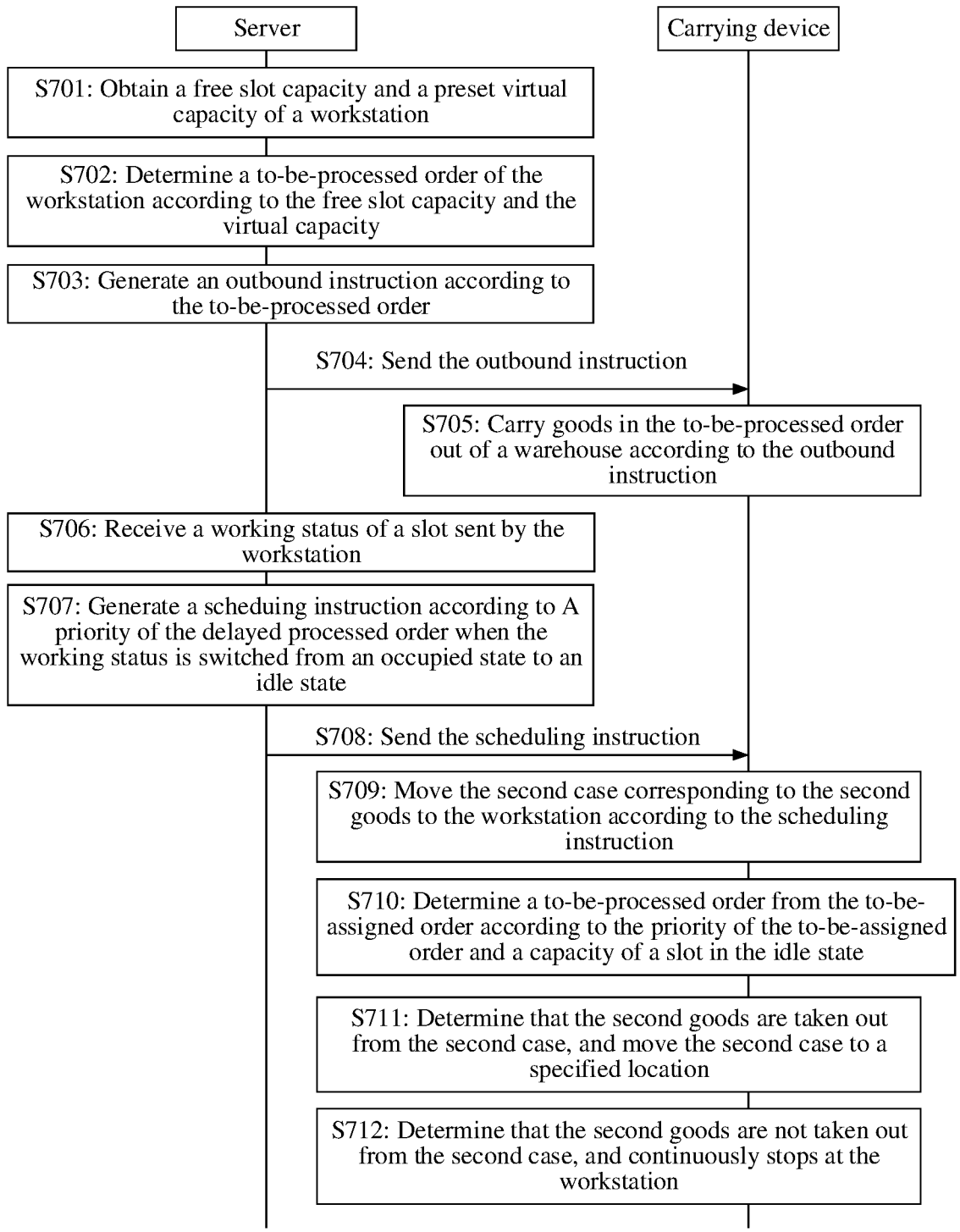
FIG. 7 is a schematic flowchart of an outbound method according to another embodiment of the present disclosure.

As shown in FIG. 7, in an example where the transfer device can only move goods in a delayed processed order, another embodiment of the present disclosure provides an outbound method, applied to the foregoing order processing system. The outbound method includes the following steps:

S701: A server obtains a free slot capacity and a preset virtual capacity of a workstation.

S702: The server determines a to-be-processed order of the workstation according to the free slot capacity and the virtual capacity.

S703: The server generates an outbound instruction according to the to-be-processed order.

S704: The transfer device receives the outbound instruction sent by the server.

S705: The transfer device carries goods in the to-be-processed order out of a warehouse according to the outbound instruction.

The outbound instruction is a second outbound instruction. The transfer device moves a second case corresponding to second goods in the delayed processed order from the warehouse to a pre-storage area.

S706: The server receives a working status of a slot sent by the workstation.

The working status of the slot includes an operating state and an idle state. When the slot of the workbench is picking or the transfer device is queuing in the queuing area of the workbench, the working status of the slot is the operating state. When the slot of the workbench completes the picking task or no transfer device is queuing, the working status of the slot is the idle state.

S707: The server generates a scheduling instruction according to a priority of the delayed processed order when the working status is switched from an occupied state to an idle state.

When the working status is switched from an occupied state to an idle state, that is, the slot of the workbench completes the picking task, the server selects a order with a higher priority from the delayed processed order, and generates a scheduling instruction according to the order with higher priority.

When the order with higher priority is selected from the delayed processed order, a quantity of the selected order is determined according to a quantity of a slot in the idle state. The generating a scheduling instruction according to the order with higher priority specifically includes: determining the transfer device where goods in the selected delayed processed order is located; generating a movement path according to the pre-storage area where the transfer device is currently located and the location of the workbench to which the slot in the idle state belong; and generating a scheduling instruction according to the movement path.

For example, the current workbench has five slots, where three slots complete the picking of the currently processed orders. Three orders are selected from the delayed processed orders, and the location of the transfer device transferring the goods in the three orders is determined. A scheduling instruction is generated according to the location of the transfer device and the location of the workbench.

S708: The transfer device receives the scheduling instruction sent by the server.

S709: The transfer device moves the second case corresponding to the second goods to the workstation according to the scheduling instruction.

The transfer device receives the scheduling instruction from the server, and the transfer device moves the second case corresponding to the second goods in the delayed processed order to the workstation according to the scheduling instruction. Specifically, a scheduling path is obtained by parsing the scheduling instruction, and the second case corresponding to the second goods is moved to the workstation according to the scheduling path.

S710: The server determines, when the working status is switched from an occupied state to an idle state, a to-be-processed order from a to-be-assigned order according to a priority of the to-be-assigned order and a capacity of a slot in the idle state.

When the working status of the slot is the idle state, the order with high priority in the delayed processed orders enter the workbench for picking, and the virtual capacity of the workbench is released. An order is then selected from the to-be-assigned orders as a to-be-processed order. The quantity of the order selected in the to-be-assigned orders is the slot virtual capacity.

It should be noted that, S710 is not limited to be after S709, and may be at any position after S707, which is only schematically described herein.

S711: The transfer device determines that the second goods are taken out from the second case, and moves the second case to a specified location.

The transfer device determines whether information about the completion of picking at the workstation is received, and determines, if the information is received, that all the second goods are taken out of the second case. The transfer device moves the second case from the workstation to the specified location.

The specified location may be the pre-storage area. When the workstation picks the goods in the delayed processed orders, the goods may be picked in batches. When the workstation completes the picking of the goods in the delayed processed orders of the current batch, the transfer device may move to the pre-storage area and wait for the picking of goods in the delayed processed orders of the next batch, until the goods in the delayed processed orders of all batches are picked.

The specified location may be alternatively the original storage space of the second case in the warehouse, another storage space in the warehouse, a temporary storage point, or a storage point for storing empty cases. That is, the case returning task may be performed according to the condition of the goods in the second case.

For example, when the quantity of goods in the second case is greater than the quantity threshold for sorting a case, the second case may be carried to the original storage space or other storage spaces in the warehouse. Otherwise, the second case may be carried to a temporary storage point, and the second case may be combined with other cases for sorting. If the second case is empty, the second case may be carried to an empty case storage point.

S712: The transfer device determines that the second goods are not taken out from the second case, and continuously stops at the workstation.

When the workstation does not complete the picking of the goods in the delayed processed orders, the transfer device continues to stop at the workstation for picking.

In the outbound method provided in the embodiments of the present disclosure, the working status of a slot of the workstation is monitored in real time. When the slots are free, goods in the delayed processed order with a higher priority are moved from the pre-storage area to the workbench for picking. Since the goods are pre-moved to the pre-storage area, the movement time is shortened compared with moving the goods from the storage space to the workbench, which can reduce the waiting time of the workbench and improve the outbound efficiency.

Figure 8:
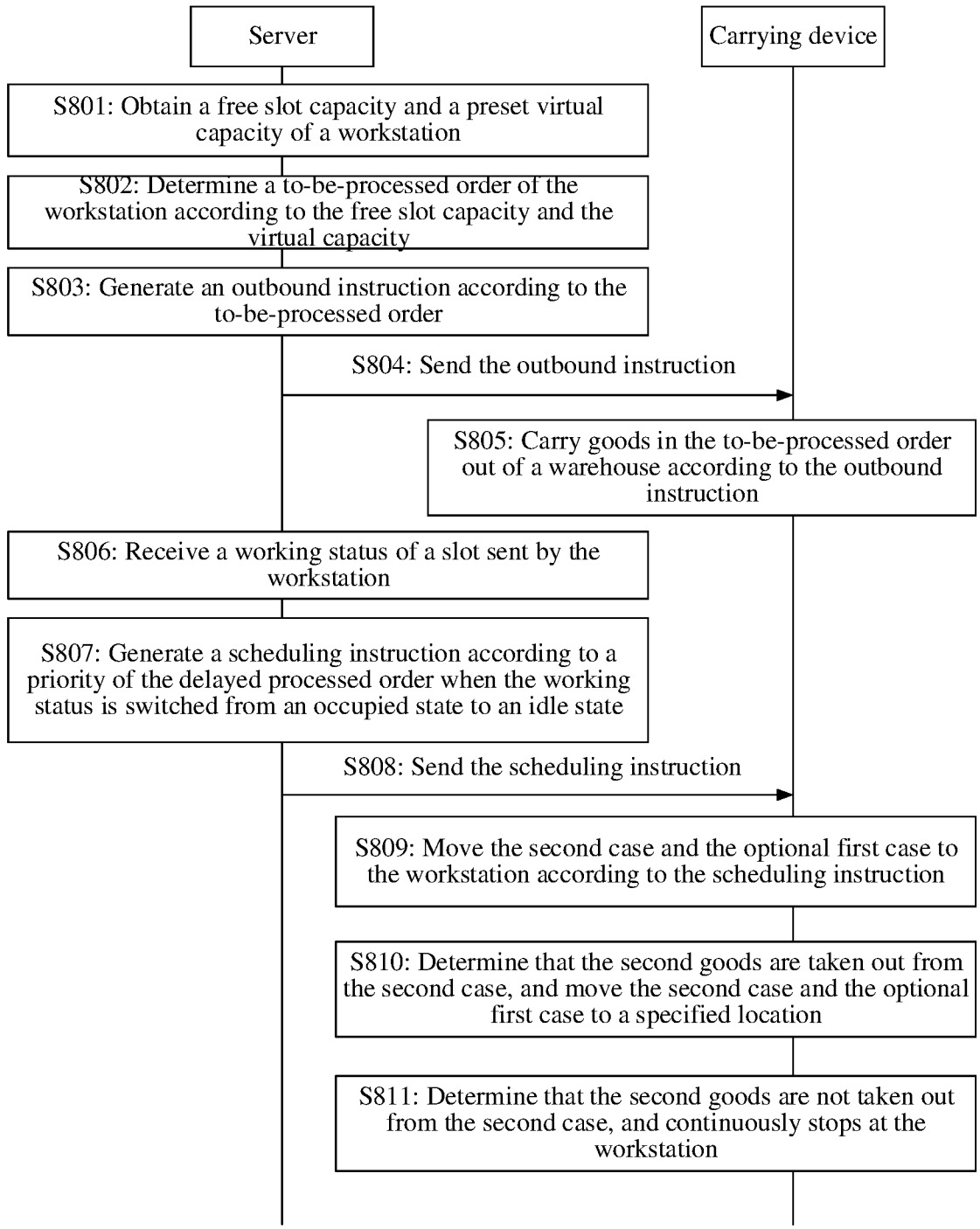
FIG. 8 is a schematic flowchart of an outbound method according to another embodiment of the present disclosure.

As shown in FIG. 8, in an example where the transfer device carries goods in two types of orders, another embodiment of the present disclosure provides an outbound method, applied to the foregoing order processing system. The outbound method includes the following steps:

S801: A server obtains a free slot capacity and a preset virtual capacity of a workstation.

This step is described in detail in S201, and the details are not repeated herein.

S802: The server determines a to-be-processed order of the workstation according to the free slot capacity and the virtual capacity.

This step is described in detail in S202, and the details are not repeated herein.

S803: The server generates an outbound instruction according to the to-be-processed order.

The outbound instruction includes a third outbound instruction. The third outbound instruction is used for instructing the transfer device to move goods in the currently processed order to the workstation for picking, and instructing the transfer device to move goods in the delayed processed order to the pre-storage area for waiting to be picked, and the goods in the currently processed order are moved to the workstation preferentially.

S804: The transfer device receives the outbound instruction sent by the server.

S805: The transfer device carries goods in the to-be-processed order out of a warehouse according to the outbound instruction.

The transfer device determines the movement path by parsing the third outbound instruction, and moves the first case corresponding to the first goods and the second case corresponding to the second goods to the workbench according to the movement path. After the workbench completes the task of picking the first goods, the second case corresponding to the second goods is moved to the pre-storage area.

S806: The server receives a working status of a slot sent by the workstation.

S807: The server generates a scheduling instruction according to a priority of the delayed processed order when the working status is switched from an occupied state to an idle state.

S808: The server sends the scheduling instruction to the transfer device.

S809: The transfer device moves the second case to the workstation according to the scheduling instruction.

When the workbench has a free slot, the transfer device receives the scheduling instruction sent by the server, to move the second case to the workstation according to the scheduling instruction. The picking of the goods in the delayed processed order is completed by the workstation. Specifically, the scheduling instruction is parsed to obtain a second path; and the second case is moved from the pre-storage area to the workstation according to the second path. That is, the second case and the first case may be moved to the workbench. Alternatively, only the second case is moved to the workbench.

S810: The transfer device determines that the second goods are taken out from the second case, and moves the second case to a specified location.

The transfer device determines whether information about the completion of picking at the workstation is received, and determines, if the information is received, that all the second goods are taken out of the second case. The transfer device moves the second case from the workstation to the specified location. That is, the second case and the first case may be moved to the specified location. Alternatively, only the second case is moved to the specified location.

The specified location may be the pre-storage area. When the workstation picks the goods in the delayed processed orders, the goods may be picked in batches. When the workstation completes the picking of the goods in the delayed processed orders of the current batch, the transfer device may move to the pre-storage area and wait for the picking of goods in the delayed processed orders of the next batch, until the goods in the delayed processed orders of all batches are picked.

The specified location may be the original storage space of the first case and the second case in the warehouse, another storage space in the warehouse, a temporary storage point, or a storage point for storing empty cases. That is, the case returning task may be performed according to the condition of the goods in the first case and the second case.

Taking the first case as an example, when the quantity of goods in the first case is greater than the quantity threshold for sorting a case, the first case may be carried to the original storage space or other storage spaces in the warehouse. Otherwise, the first case may be carried to a temporary storage point, and the first case may be combined with other cases for sorting. If the first case is empty, the first case may be carried to an empty case storage point.

S811: The transfer device determines that the second goods are not taken out from the second case, and continuously stops at the workstation.

When the workstation does not complete the picking of goods in a specific delayed processed order, the transfer device continues to stop at the workstation for picking.

In the outbound method provided in the embodiments of the present disclosure, the working status of a slot of the workstation and the picking status of the goods moved by the transfer device are monitored in real time. The scheduling instruction is generated according to the working status of the slot or the picking status of the goods, to implement the movement in the pre-storage area, the workbench, and the storage spaces corresponding to the cases, achieving rapid outbound.

Figure 9:
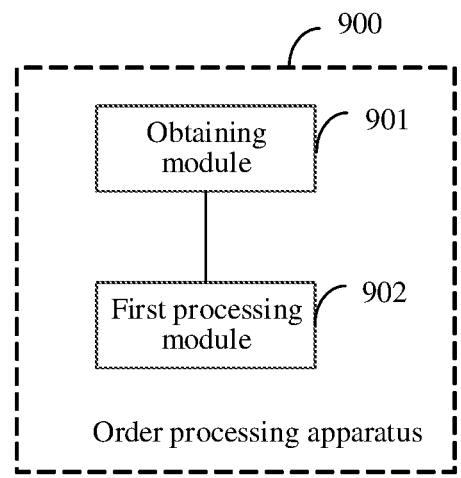
FIG. 9 is a schematic structural diagram of an outbound apparatus according to another embodiment of the present disclosure.

As shown in FIG. 9, this application provides an order processing apparatus 900. The apparatus includes:
an obtaining module 901, configured to obtain a free slot capacity and a preset virtual capacity of a workstation; and
a first processing module 902, configured to determine a to-be-processed order of the workstation according to the free slot capacity and the virtual capacity.

Optionally, the first processing module 902 is specifically configured to:
obtain a priority of a to-be-assigned order; and
determine the to-be-processed order from the to-be-assigned order according to the priority of the to-be-assigned order, so that a quantity of the to-be-processed order is a sum of the free slot capacity and the virtual capacity.

Optionally, the first processing module 902 is specifically configured to: obtain a priority of the to-be-processed order; and
determine a currently processed order from the to-be-processed order according to the priority of the to-be-processed order, so that a quantity of the currently processed order is the free slot capacity.

Optionally, the first processing module 902 is specifically configured to:
determine a delayed processed order from the to-be-processed order according to the priority of the to-be-processed order, so that a quantity of the delayed processed order is the virtual capacity.

Optionally, the first processing module 902 is further configured to:
generate an outbound instruction according to the to-be-processed order, so that a transfer device transfers goods in the to-be-processed order out of a warehouse.

Optionally, the first processing module 902 is specifically configured to:
obtain first order information of the currently processed order and a location of a workstation; and
generate a first outbound instruction according to the first order information and the location of the workstation, where
the first outbound instruction is used for causing the transfer device to move goods in the currently processed order to the workstation for picking.

Optionally, the first processing module 902 is specifically configured to:
obtain second order information of the delayed processed order and a location of a pre-storage area; and
generate a second outbound instruction according to the second order information and the location of the pre-storage area, where
the second outbound instruction is used for causing the transfer device to move goods in the delayed processed order to the pre-storage area for waiting.

Optionally, the first processing module 902 is specifically configured to:
obtain first order information of the currently processed order, second order information of the delayed processed order, a location of a workstation, and a location of a pre-storage area; and
generate a third outbound instruction according to the first order information, the second order information, the location of the workstation, and the location of the pre-storage area, where
the third outbound instruction is used for causing the transfer device to move goods in the currently processed order to the workstation for picking, and causing the transfer device to move goods in the delayed processed order to the pre-storage area for waiting, and the goods in the currently processed order are moved to the workstation preferentially.

Optionally, the first processing module 902 is further configured to:
  receive a working status of a slot sent by the workstation; and
  generate a scheduling instruction according to a priority of the delayed processed order when the working status is switched from an occupied state to an idle state, where
  the scheduling instruction is used for causing the transfer device to move goods in the delayed processed order from the pre-storage area to the workstation for picking.

Figure 10:
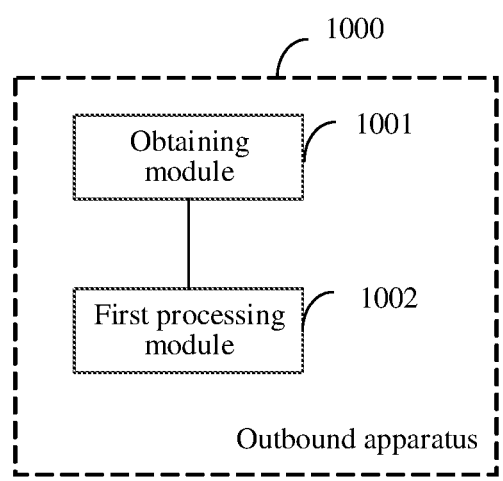
FIG. 10 is a schematic structural diagram of an outbound apparatus according to another embodiment of the present disclosure.

As shown in FIG. 10, this application provides an outbound apparatus 1000. The apparatus includes:
  a receiving module 1001, configured to receive an outbound instruction sent by a server, where the outbound instruction is generated according to a to-be-processed order, and the to-be-processed order is determined according to a free slot capacity and a preset virtual capacity of a workstation; and
  a second processing module 1002, configured to transfer goods in the to-be-processed order out of a warehouse according to the outbound instruction.

Optionally, the to-be-processed order include a currently processed order and a delayed processed order, a quantity of the currently processed order is the free slot capacity, and a quantity of the delayed processed order is the virtual capacity.

Optionally, the outbound instruction includes a third outbound instruction; and the second processing module 1002 is specifically configured to:
  move a first case corresponding to first goods in the currently processed order and a second case corresponding to second goods in the delayed processed order from the warehouse to the workstation according to the third outbound instruction.

Optionally, the second processing module 1002 is specifically configured to:
  parse a first path from the third outbound instruction;
  respectively take out the first case and the second case from the warehouse according to the first path; and
  move the first case and the second case to the workstation according to the first path.

Optionally, the second processing module 1002 is further configured to:
  determine whether the first goods are taken out from the first case;
  move the second case to a pre-storage area according to the first path if the first goods are taken out from the first case; or
  continuously stop at the workstation if the first goods are not taken out from the first case.

Optionally, the second processing module 1002 is further configured to:
  receive a scheduling instruction sent by the server;
  parse the scheduling instruction to obtain a second path; and
  move the second case from the pre-storage area to the workstation according to the second path.

Optionally, the second processing module 1002 is further configured to:
  determine whether the second goods are taken out from the second case;
  move the second case from the workstation to a specified location if the second goods are taken out from the second case; or
  continuously stop at the workstation if the second goods are not taken out from the second case.

Optionally, the outbound instruction includes a second outbound instruction; and the second processing module 1002 is further configured to:
  move a second case corresponding to second goods in the delayed processed order from the warehouse to a pre-storage area according to the second outbound instruction.

Optionally, the second processing module 1002 is specifically configured to:
  parse a third path from the second outbound instruction;
  take out the second case from the warehouse according to the third path; and
  move the second case from the warehouse to the pre-storage area according to the third path.

Optionally, the second processing module 1002 is further configured to:
  receive a scheduling instruction sent by the server, where the scheduling instruction is generated when a working status of a slot of the workstation is switched from an occupied state to an idle state; and
  move the second case from the pre-storage area to the workstation according to the scheduling instruction.

Optionally, the second processing module 1002 is specifically configured to:
  determine whether the second goods are taken out from the second case;
  move the second case from the workstation to a specified location if the second goods are taken out from the second case; or
  continuously stop at the workstation if the second goods are not taken out from the second case.

Figure 11:
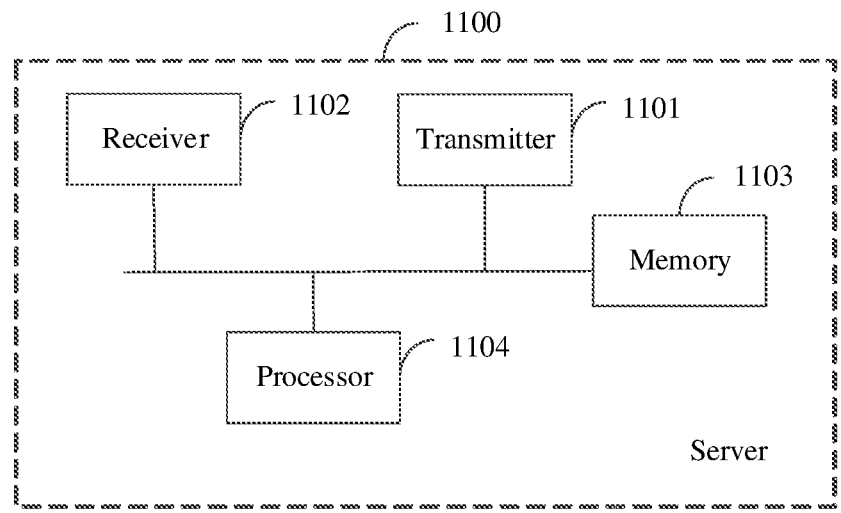
FIG. 11 is a schematic structural diagram of a server according to another embodiment of the present disclosure.

As shown in FIG. 11, a server 1100 provided in another embodiment of the present disclosure includes: a transmitter 1101, a receiver 1102, a memory 1103, and a processor 1104.

The transmitter 1101 is configured to send instructions and data.

The receiver 1102 is configured to receive instructions and data.

The memory 1103 is configured to store computer executable instructions.

The processor 1104 is configured to execute the computer executable instructions stored in the memory to implement the steps performed in the order processing method or the outbound method in the foregoing embodiments. For details, reference may be made to related descriptions in the foregoing embodiments of the order processing method.

Optionally, the memory 1103 may be independent or integrated with the processor 1104.

When the memory 1003 is disposed independently, the processing device further includes a bus for connecting the memory 1103 and the processor 1104.

Figure 12:
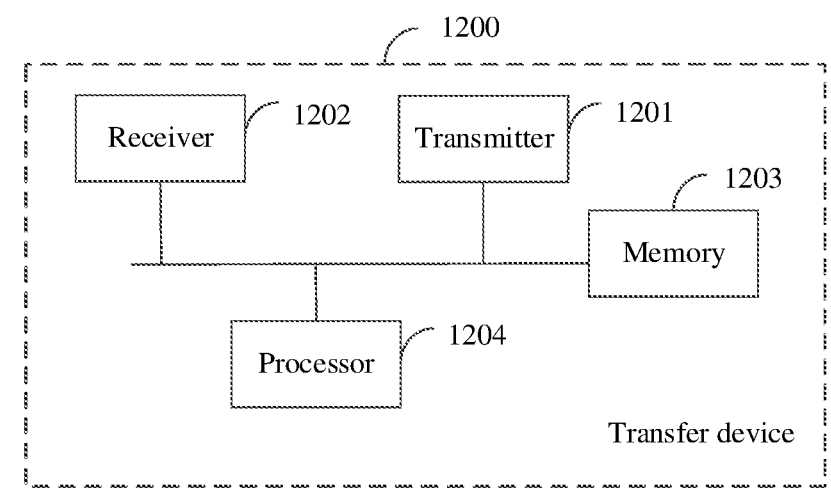
FIG. 12 is a schematic structural diagram of a transfer device according to another embodiment of the present disclosure.

As shown in FIG. 12, a transfer device 1200 provided in another embodiment of the present disclosure includes: a transmitter 1201, a receiver 1202, a memory 1203, and a processor 1204.

The transmitter 1201 is configured to send instructions and data.

The receiver 1202 is configured to receive instructions and data.

The memory 1203 is configured to store computer executable instructions.

The processor 1204 is configured to execute the computer executable instructions stored in the memory to implement the steps performed in the outbound method in the foregoing embodiments. For details, reference may be made to related descriptions in the foregoing embodiments of the outbound method.

Optionally, the memory 1203 may be independent or integrated with the processor 1204.

When the memory 1203 is disposed independently, the processing device further includes a bus for connecting the memory 1203 and the processor 1204.

An embodiment of the present disclosure further provides a computer-readable storage medium, storing computer executable instructions, where a processor, when executing the computer executable instructions, implements the order processing method or the outbound method performed by the foregoing transfer device.

Finally, it should be noted that the foregoing embodiments are merely used for describing the technical solutions of the present disclosure, but are not intended to limit the present disclosure. Although the present disclosure is described in detail with reference to the foregoing embodiments, a person of ordinary skill in the art is to understand that, modifications may still be made to the technical solutions in the foregoing embodiments, or equivalent replacements may be made to some or all of the technical features; and these modifications or replacements will not cause the essence of corresponding technical solutions to depart from the scope of the technical solutions in the embodiments of the present disclosure.

What is claimed is:

1. An order processing method, applied to a server, the method comprising:
    obtaining a free slot capacity and a preset virtual capacity of a workstation;
    determining a to-be-processed order of the workstation according to the free slot capacity and the virtual capacity, wherein a quantity of the to-be-processed order is a sum of the free slot capacity and the virtual capacity; and
    generating an outbound instruction according to the to-be-processed order, so that a transfer device transfers goods in the to-be-processed order out of a warehouse;
    wherein the to-be-processed order comprises a currently processed order and a delayed processed order, a quantity of the currently processed order is the free slot capacity, and a quantity of the delayed processed order is the virtual capacity;
    wherein the outbound instruction comprises an outbound instruction which is used for causing the transfer device to move goods in the currently processed order to the workstation for picking, and causing the transfer device to move goods in the delayed processed order to the pre-storage area for waiting, and the goods in the currently processed order are moved to the workstation preferentially.

2. The method according to claim 1, wherein the determining the to-be-processed order of the workstation according to the free slot capacity and the virtual capacity further comprises:
    obtaining a priority of a to-be-assigned order; and
    determining the to-be-processed order from the to-be-assigned order according to the priority of the to-be-assigned order.

3. The method according to claim 2, wherein after the determining the to-be-processed order from the to-be-assigned order according to the priority of the to-be-assigned order, the method further comprises:
    obtaining a priority of the to-be-processed order; and
    determining the currently processed order or the delayed processed order from the to-be-processed order according to the priority of the to-be-processed order.

4. The method according to claim 1, wherein after the determining to-be-processed order of the workstation according to the free slot capacity and the virtual capacity, the method further comprises:
    receiving a working status of a slot sent by the workstation; and
    generating a scheduling instruction according to a priority of the delayed processed order when the working status is switched from an occupied state to an idle state, wherein
    the scheduling instruction is used for causing the transfer device to move goods in the delayed processed order from the pre-storage area to the workstation for picking.

5. An outbound method, applied to a transfer device, the method comprising:
    receiving an outbound instruction sent by a server, wherein the outbound instruction is generated according to a to-be-processed order, and the to-be-processed order is determined according to a free slot capacity and a preset virtual capacity of a workstation; and
    transferring goods in the to-be-processed order out of a warehouse according to the outbound instruction;
    wherein a quantity of the to-be-processed order is a sum of the free slot capacity and the virtual capacity;
    wherein the to-be-processed order comprises a currently processed order and a delayed processed order, a quantity of the currently processed order is the free slot capacity, and a quantity of the delayed processed order is the virtual capacity;
    wherein the outbound instruction comprises an outbound instruction which is used for causing the transfer device to move goods in the currently processed order to the workstation for picking, and causing the transfer device to move goods in the delayed processed order to the pre-storage area for waiting, and the goods in the currently processed order are moved to the workstation preferentially.

6. A server, comprising:
    a memory, configured to store a program; and
    a processor, configured to execute the program stored in the memory, wherein when the program is executed, the processor is configured to perform the following steps:
    obtaining a free slot capacity and a preset virtual capacity of a workstation;
    determining a to-be-processed order of the workstation according to the free slot capacity and the virtual capacity, wherein a quantity of the to-be-processed order is a sum of the free slot capacity and the virtual capacity; and
    generating an outbound instruction according to the to-be-processed order, so that a transfer device transfers goods in the to-be-processed order out of a warehouse;
    wherein the to-be-processed order comprises a currently processed order and a delayed processed order, a quantity of the currently processed order is the free slot capacity, and a quantity of the delayed processed order is the virtual capacity;
    wherein the outbound instruction comprises an outbound instruction which is used for causing the transfer device to move goods in the currently processed order to the workstation for picking, and causing the transfer device to move goods in the delayed processed order to the pre-storage area for waiting, and the goods in the currently processed order are moved to the workstation preferentially.

7. The server according to claim 6, wherein the processor is configured to perform the following steps:
obtaining a priority of a to-be-assigned order; and
determining the to-be-processed order from the to-be-assigned order according to the priority of the to-be-assigned order.

8. The server according to claim 7, wherein the processor is configured to perform the following steps:
obtaining a priority of the to-be-processed order; and
determining the currently processed order or the delayed processed order from the to-be-processed order according to the priority of the to-be-processed order.

9. The server according to claim 6, wherein the processor is configured to perform the following steps:
receiving a working status of a slot sent by the workstation; and
generating a scheduling instruction according to a priority of the delayed processed order when the working status is switched from an occupied state to an idle state, wherein
the scheduling instruction is used for causing the transfer device to move goods in the delayed processed order from the pre-storage area to the workstation for picking.

10. A transfer device, comprising:
a memory, configured to store a program; and
a processor, configured to execute the program stored in the memory, wherein when the program is executed, the processor is configured to perform the following steps:
receiving an outbound instruction sent by a server, wherein the outbound instruction is generated according to a to-be-processed order, and the to-be-processed order is determined according to a free slot capacity and a preset virtual capacity of a workstation; and
transferring goods in the to-be-processed order out of a warehouse according to the outbound instruction;
wherein a quantity of the to-be-processed order is a sum of the free slot capacity and the virtual capacity;
wherein the to-be-processed order comprises a currently processed order and a delayed processed order, a quantity of the currently processed order is the free slot capacity, and a quantity of the delayed processed order is the virtual capacity;
wherein the outbound instruction comprises an outbound instruction which is used for causing the transfer device to move goods in the currently processed order to the workstation for picking, and causing the transfer device to move goods in the delayed processed order to the pre-storage area for waiting, and the goods in the currently processed order are moved to the workstation preferentially.

* * * * *